(12) United States Patent  
Pfiffner et al.

(10) Patent No.: US 8,517,394 B2
(45) Date of Patent: Aug. 27, 2013

(54) ADJUSTABLE SUSPENSION SYSTEM FOR A WORK VEHICLE

(75) Inventors: Kenneth Charles Pfiffner, Waterloo, IA (US); Benjamin Lee McCash, Burr Ridge, IL (US); David Rach, Plainfield, IL (US)

(73) Assignee: CNH America LLC

( * ) Notice: Subject to any disclaimer, the term of this patent is extended or adjusted under 35 U.S.C. 154(b) by 0 days.

(21) Appl. No.: 13/564,599

(22) Filed: Aug. 1, 2012

(65) Prior Publication Data

US 2013/0033011 A1 Feb. 7, 2013

Related U.S. Application Data

(60) Provisional application No. 61/513,958, filed on Aug. 1, 2011.

(51) Int. Cl.
*B60G 17/00* (2006.01)
(52) U.S. Cl.
USPC ...................................... 280/5.514
(58) Field of Classification Search
USPC .............. 280/5.514, 5.515, 5.5, 5.502, 5.506, 280/5.507, 5.508, 5.509, 124.1, 124.103, 280/124.106
See application file for complete search history.

(56) References Cited

U.S. PATENT DOCUMENTS

| | | | |
|---|---|---|---|
| 4,552,238 A * | 11/1985 | Joyce, Jr. | ...................... 180/420 |
| 4,621,832 A | 11/1986 | Nakashima et al. | |
| 4,865,148 A | 9/1989 | Marumoto et al. | |
| 5,120,031 A | 6/1992 | Charles et al. | |
| 5,149,131 A * | 9/1992 | Sugasawa et al. | ......... 280/5.512 |
| 5,251,927 A | 10/1993 | Charles et al. | |
| 5,294,146 A | 3/1994 | Tabata et al. | |
| 5,476,276 A * | 12/1995 | Hurlburt | ..................... 280/137.5 |
| 5,570,287 A | 10/1996 | Campbell et al. | |
| 6,491,129 B1 | 12/2002 | Young et al. | |
| 6,585,275 B1 | 7/2003 | Carlstedt et al. | |
| 6,634,445 B2 | 10/2003 | Dix et al. | |
| 6,719,313 B2 | 4/2004 | Zadok | |
| 7,644,942 B2 * | 1/2010 | Bordini et al. | ......... 280/124.112 |

FOREIGN PATENT DOCUMENTS

JP 02034479 A 2/2002

* cited by examiner

*Primary Examiner* — Faye M. Fleming
(74) *Attorney, Agent, or Firm* — Sue C. Watson (57) ABSTRACT

A suspension system is provided that includes an axle configured to support a first wheel on a first lateral end of the axle, and a second wheel on a second lateral end of the axle. The suspension system also includes a steering assembly configured to rotate each wheel relative to the axle about a substantially vertical axis. In addition, the suspension system includes an actuating cylinder extending between the axle and a frame of a work vehicle. The actuating cylinder is configured to transition the frame between a lowered position that enables the steering assembly to rotate each wheel through a first range of motion without contact between the wheels and a component of the work vehicle, and a raised position that enables the steering assembly to rotate the wheels through a second range of motion, greater than the first range of motion.

20 Claims, 7 Drawing Sheets

ADJUSTABLE SUSPENSION SYSTEM FOR A WORK VEHICLE

CROSS REFERENCE TO RELATED APPLICATIONS

This application claims priority from and the benefit of U.S. Provisional Patent Application No. 61/513,958, entitled "Adjustable Suspension System for a Work Vehicle," filed Aug. 1, 2011, which is hereby incorporated by reference in its entirety.

BACKGROUND

The invention relates generally to work vehicles, such as tractors, and more particularly to an adjustable suspension system for a work vehicle.

Work vehicles, such as agricultural tractors, may be employed to tow a variety of equipment (e.g., planters, seeders, tillage implements, etc.) through a field. Certain work vehicles include a suspension system to damp vibrations caused by uneven field conditions, thereby enhancing ride quality and reducing wear on certain work vehicle components. For example, the suspension system may include an axle configured to support a wheel on each lateral end of the axle, and an axle carrier extending between a frame of the work vehicle and the axle. The axle carrier is configured to rotate relative to the frame about a lateral axis to facilitate vertical movement of the axle. In addition, the axle is configured to pivot about the axle carrier to enable the axle to oscillate about a substantially longitudinal axis. The suspension system also includes a first actuating cylinder extending between a first lateral side of the axle and the frame, and a second actuating cylinder extending between a second lateral side of the axle and the frame. The first and second actuating cylinders are configured to damp vertical and oscillatory movement of the axle, thereby enhancing ride quality.

Certain work vehicles also include a steering assembly configured to rotate each wheel relative to the axle about a substantially vertical axis. Components of the work vehicle are generally arranged to provide clearance between the wheels and the adjacent components (e.g., hood, engine, frame, etc.), thereby enabling the steering assembly to rotate the wheels through a desired range of motion. However, if a work vehicle employs larger components (e.g., engines, cooling fans, etc.), the steering range of motion may be undesirably limited. While raising the frame relative to the axle may expand the steering range of motion, the resulting increased hood height may obstruct operator visibility.

BRIEF DESCRIPTION

The present invention provides a suspension system including an axle configured to support a first wheel on a first lateral end of the axle, and a second wheel on a second lateral end of the axle. The suspension system also includes a steering assembly configured to rotate each wheel relative to the axle about a substantially vertical axis. In addition, the suspension system includes an actuating cylinder extending between the axle and a frame of a work vehicle. The actuating cylinder is configured to transition the frame between a lowered position that enables the steering assembly to rotate each wheel through a first range of motion without contact between the wheels and a component of the work vehicle, and a raised position that enables the steering assembly to rotate the wheels through a second range of motion without contact between the wheels and the component. The second range of motion is greater than the first range of motion. In this configuration, operator visibility is enhanced while the frame is in the lowered position due to a reduction in hood height relative to the soil surface. In addition, to accommodate increased steering angles, the frame may be temporarily transitioned toward the raised position to provide additional clearance between the wheels and the component.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
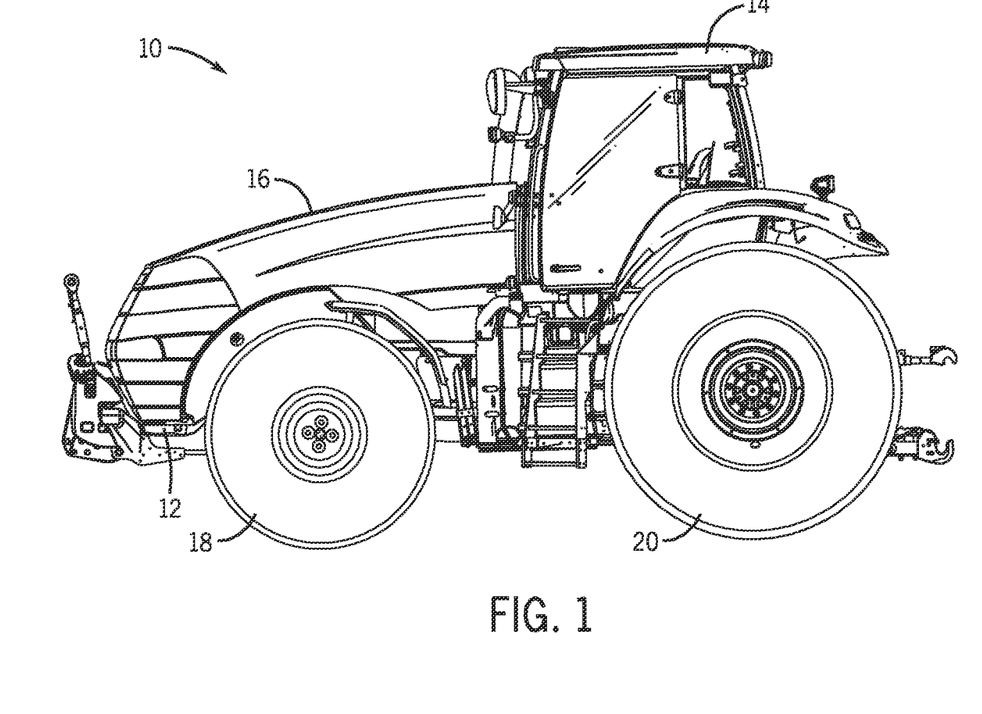
FIG. 1 is a side view of an exemplary work vehicle that may include a suspension system configured to adjust frame position based on steering angle.

FIG. 1 is a side view of an exemplary work vehicle 10 that may include a suspension system configured to adjust frame position based on steering angle. As illustrated, the work vehicle 10 includes a frame 12 configured to support a cab 14, a hood 16, front wheels 18, rear wheels 20, and various other components of the work vehicle 10. The cab 14 provides an enclosed space for an operator, and the hood 16 houses the engine and/or other systems configured to facilitate operation of the work vehicle 10 (e.g., hydraulic systems, pneumatic systems, electrical systems, mechanical systems, etc.). The wheels 18 and 20 are driven to rotate by the engine, thereby facilitating movement of the vehicle across a field, for example.

As discussed in detail below, the front wheels 18 are coupled to a suspension system configured to adjust a position of the frame 12 relative to a front axle based on a steering angle of the front wheels 18. For example, in certain embodiments, the suspension system includes an axle configured to support a first wheel 18 on a first lateral end of the axle, and a second wheel 18 on a second lateral end of the axle. The suspension system also includes a steering assembly configured to rotate each wheel 18 relative to the axle about a substantially vertical axis. In addition, the suspension system includes an actuating cylinder extending between the axle and the frame 12 of the work vehicle 10. The actuating cylinder is configured to transition the frame between a lowered position that enables the steering assembly to rotate each wheel 18 through a first range of motion without contact between the wheels 18 and a component (e.g., the hood 16, the engine, the frame 12, etc.) of the work vehicle 10, and a raised position that enables the steering assembly to rotate the wheels 18 through a second range of motion, greater than the first range of motion, without contact between the wheels 18 and the component.

In certain embodiments, the actuating cylinder is configured to enable movement of the axle with respect to the frame 12 over a range of suspension travel. In such embodiments, the actuating cylinder may damp vertical movement of the axle as the work vehicle 10 traverses an uneven field, thereby improving ride quality, and reducing wear on certain work vehicle components. While the frame is in the lowered position, a piston rod within the actuating cylinder may extend and retract over a full range of motion, thereby providing a significant amount of suspension travel (e.g., about 110 mm). However, due to geometric limitations of the work vehicle 10, the steering range of motion may be limited. Therefore, the actuating cylinder may extend the piston rod, thereby transitioning the frame toward the raised position, and increasing clearance between the wheels 18 and the component of the work vehicle 10. However, as the frame transitions toward the raised position, the range of suspension travel decreases (e.g., to about 55 mm). As a result, the actuating cylinder may absorb less energy associated with wheel movement over uneven terrain. In this configuration, the work vehicle 10 may provide a substantially smooth ride while the steering angle is limited to the first range of motion, and provide an increased steering angle through the second range of motion when desired.

Figure 2:
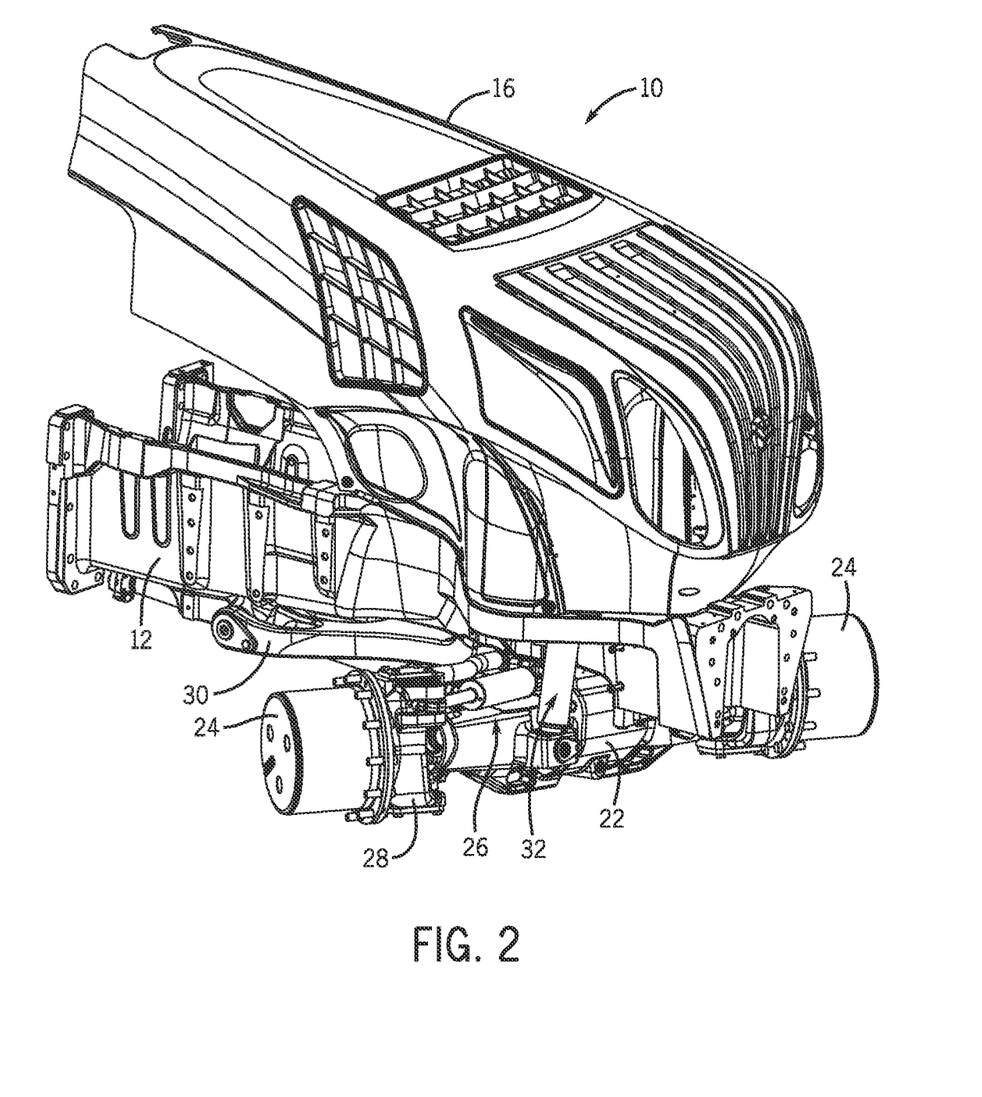
FIG. 2 is a perspective view of an embodiment of a suspension system that may be employed within the work vehicle of FIG. 1.

FIG. 2 is a perspective view of an embodiment of a suspension system that may be employed within the work vehicle of FIG. 1. As illustrated, the work vehicle 10 includes a suspension system having an axle 22 configured to support a first wheel on a first lateral end of the axle, and a second wheel on a second lateral end of the axle. In the illustrated embodiment, hubs 24 are employed to secure the wheels to the axle. The suspension system also includes a steering assembly 26 configured to rotate each wheel relative to the axle 22 about a substantially vertical axis. As illustrated, the steering assembly 26 extends between the axle 22 and a knuckle 28 rotatably coupled to each lateral end of the axle. The steering assembly 26 is configured to drive each knuckle 28 to rotate, thereby rotating the hubs 24 and the attached wheels. As discussed in detail below, the steering assembly 26 is configured to rotate the wheels through a range of motion without contact between the wheels and a component (e.g., the hood 16, the frame 12, the engine, etc.) of the work vehicle 10.

The suspension system also includes an axle carrier 30 extending between the frame 12 and the axle 22. The axle carrier 30 is configured to rotate relative to the frame 12 about a lateral axis to facilitate vertical movement of the axle 22. As discussed in detail below, the axle 22 is configured to pivot about the axle carrier 30 to enable oscillatory movement of the axle 22 about a substantially longitudinal axis. In addition, the suspension system includes a suspension assembly 32 extending between the axle 22 and the frame 12. The suspension assembly 32 is configured to enable movement of the axle 22 with respect to the frame 12 over a range of suspension travel. The suspension assembly 32 is also configured to damp vertical and oscillatory movement of the axle 12, thereby enhancing ride quality and reducing wear on certain work vehicle components.

As discussed in detail below, the suspension assembly 32 is configured to transition the frame 12 between a lowered position that enables the steering assembly 26 to rotate each wheel through a first range of motion without contact between the wheels and a component (e.g., the hood 16, the frame 12, the engine, etc.) of the work vehicle 10, and a raised position that enables the steering assembly 26 to rotate the wheels through a second range of motion, greater than the first range of motion. In the illustrated embodiment, a height of the hood 16 relative to the soil surface increases as the frame is transitioned toward the raised position, thereby decreasing operator visibility. Consequently, while a smaller steering angle is desired (e.g., while the work vehicle 10 is traversing a field along a substantially straight path), the frame is transitioned to the lowered position to enhance operator visibility. However, if a larger steering angle is desired (e.g., while the work vehicle 10 is turning at a headland), the frame may be transitioned toward the raised position to provide additional clearance between the wheels and the surrounding components, thereby increasing the steering range of motion.

Figure 3:
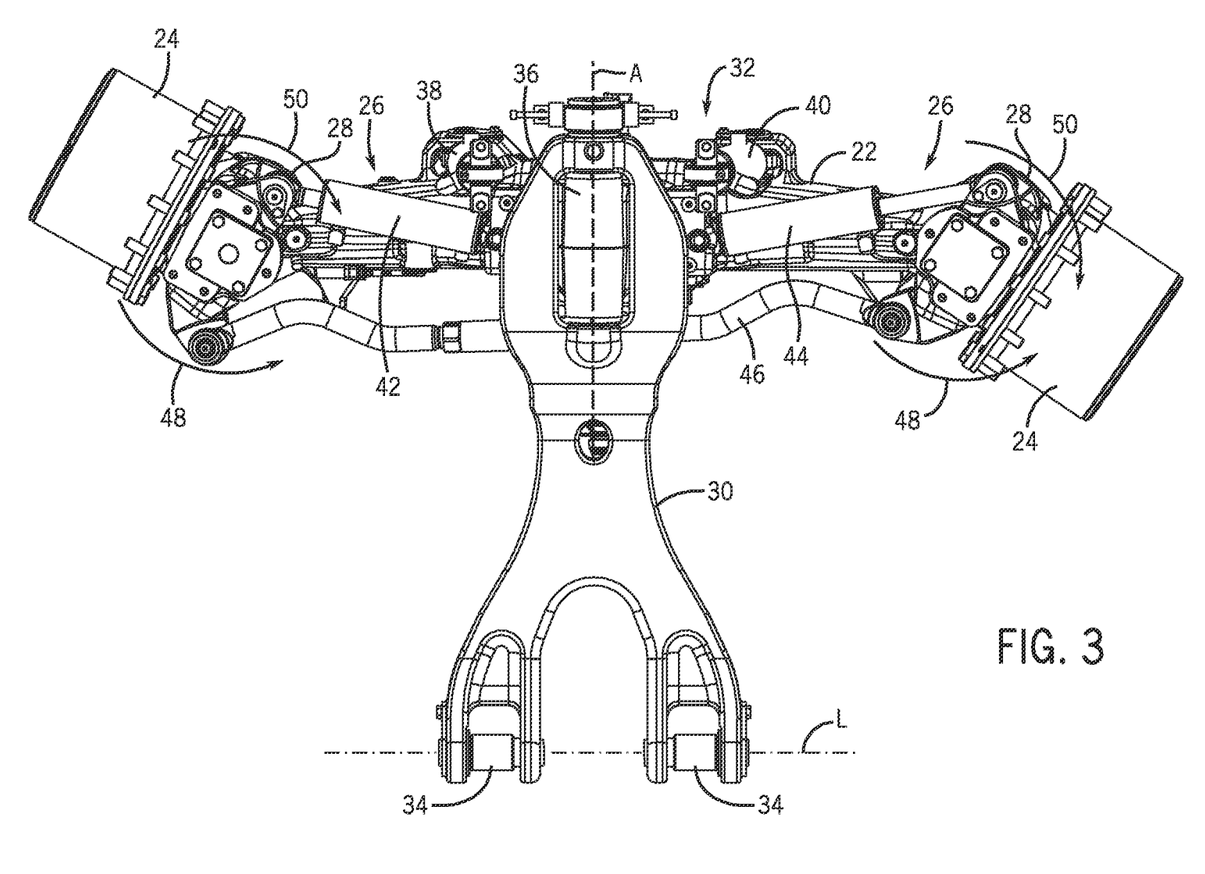
FIG. 3 is a top view of the suspension system shown in FIG. 2.

FIG. 3 is a top view of the suspension system shown in FIG. 2. As illustrated, the axle carrier 30 includes pins 34 configured to secure the axle carrier 30 to the frame 12, and to facilitate rotation of the axle carrier 30 relative to the frame about a lateral axis L. As previously discussed, rotation of the axle carrier 30 about the lateral axis L enables vertical movement of the axle 22 relative to the frame 12. In addition, the axle 22 is coupled to the axle carrier 30 by a pin 36 configured to enable the axle 22 to oscillate about a longitudinal axis A. The vertical and oscillatory movement of the axle 22 enables the work vehicle 10 to traverse uneven fields while maintaining contact between the wheels and the soil surface.

In the illustrated embodiment, the suspension assembly 32 includes a first actuating cylinder 38 and a second actuating cylinder 40. The actuating cylinders 38 and 40 are configured to damp vertical and oscillatory movement of the axle 22, thereby enhancing ride quality and substantially reducing wear on certain work vehicle components. In addition, the actuating cylinders 38 and 40 are configured to transition the frame 12 between a lowered position that enables the steering assembly 26 to rotate each wheel through a first range of motion without contact between the wheels and a component (e.g., the hood 16, the frame 12, the engine, etc.) of the work vehicle 10, and a raised position that enables the steering assembly 26 to rotate the wheels through a second range of motion, greater than the first range of motion. As discussed in detail below, certain embodiments include a sensor configured to output a signal indicative of a steering angle of the wheels, and a controller configured to receive the signal, and to instruct the actuating cylinders 38 and 40 to adjust frame position based on steering angle to provide the desired clearance between the wheels and the component of the work vehicle 10.

Furthermore, the steering assembly 26 includes a first steering cylinder 42 and a second steering cylinder 44. As illustrated, each steering cylinder extends between the axle 22 and a respective knuckle 28. The steering assembly 26 also includes a tie rod 46 extending between the knuckles 28, and configured to facilitate synchronized rotation of the wheels relative to the axle 22. In the illustrated embodiment, extension of a piston rod of the first cylinder 42 and retraction of a piston rod of the second cylinder 44 will induce the wheels to rotate in a counter-clockwise direction 48. Conversely, retraction of the piston rod of the first cylinder 42 and extension of the piston rod of the second cylinder 44 will induce the wheels to rotate in a clockwise direction 50. As discussed in detail below, the steering range of motion is at least partially dependent on the position of the frame 12 relative to the axle 22. Consequently, the actuating cylinders 38 and 40 may be adjusted to provide the desired steering range of motion.

Figure 4:
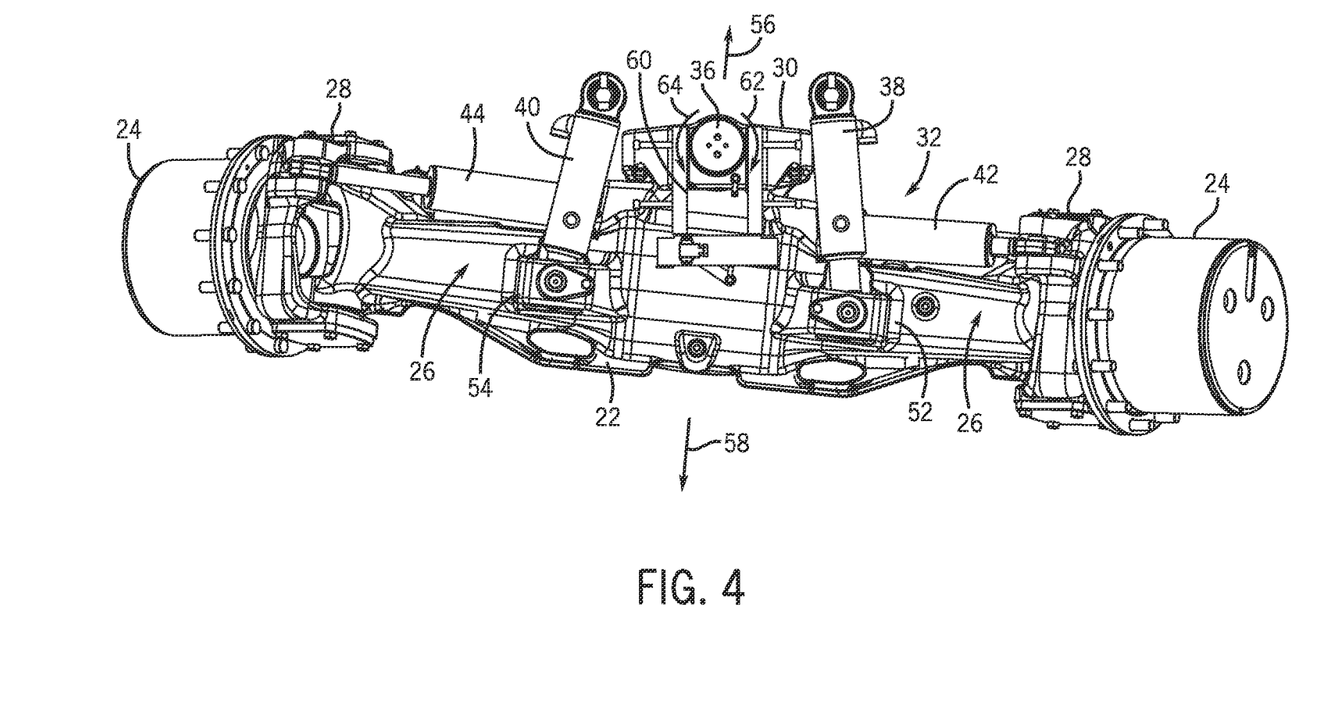
FIG. 4 is a front view of the suspension system shown in FIG. 2.

FIG. 4 is a front view of the suspension system shown in FIG. 2. As illustrated, the first actuating cylinder 38 is coupled to a first lateral side 52 of the axle 22, and the second actuating cylinder 40 is coupled to a second lateral side 54 of the axle 22. The actuating cylinders 38 and 40 are configured to damp vertical movement of the axle 22 in an upward direction 56 and in a downward direction 58. In addition, a travel limiter 60 blocks vertical movement of the axle beyond a desired range. In the illustrated embodiment, the travel limiter 60 is coupled to the frame 12, and configured to block movement of the pin 36 beyond a desired vertical range. Furthermore, the pin 36 enables oscillatory movement of the axle 22 about the longitudinal axis in a counter-clockwise direction 60 and in a clockwise direction 62. The actuating cylinders 38 and 40 serve to damp this oscillatory movement, thereby enhancing the ride quality of the work vehicle 10 by absorbing a portion of the energy associated with wheel movement over uneven terrain.

In addition, the actuating cylinders 38 and 40 are configured to transition the frame 12 between a lowered position that enables the steering assembly 26 to rotate each wheel through a first range of motion without contact between the wheels and a component of the work vehicle 10, and a raised position that enables the steering assembly 26 to rotate the wheels through a second range of motion, greater than the first range of motion. In the illustrated embodiment, the range of suspension travel decreases as the frame 12 transitions toward the raised position. For example, while the frame 12 is in the lowered position, the actuating cylinders 38 and 40 may enable the axle 22 to move about 55 mm in the upward direction 56, and about 55 mm in the downward direction 58. However, when the actuating cylinders 38 and 40 are extended to position the frame 12 in the raised position, the cylinders 38 and 40 may only enable the axle 22 to move about 27 mm in the upward direction 56, and about 27 mm in the downward direction 58. As a result, the suspension assembly 32 may absorb less energy associated with wheel movement over uneven terrain. It should be appreciated that the cylinders 38 and 40 may facilitate increased or decreased vertical movement of the axle in alternative embodiments. For example, in certain embodiments, the cylinders 38 and 40 may enable the axle to move at least about 30, 35, 40, 45, 50, 55, 60, 65, 70, 75, 80, 90, or 100 mm, or more in both the upward and downward directions while the frame 12 is in the lowered position. Furthermore, the cylinders 38 and 40 may enable the axle to move at least about 15, 17, 20, 22, 25, 27, 30, 33, 35, 37, 40, 45, or 50 mm, or more in both the upward and downward directions while the frame 12 is in the raised position.

Figure 5:
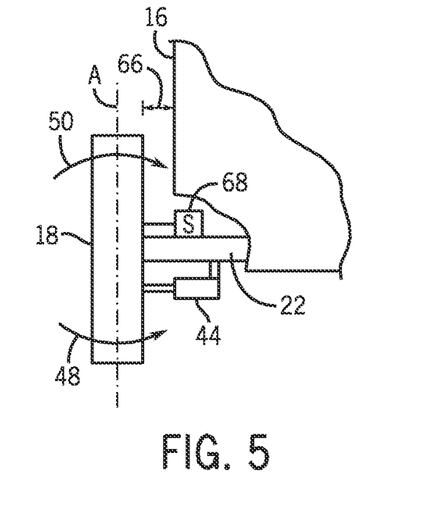
FIG. 5 is a schematic top view of an embodiment of a suspension system, in which a wheel is oriented substantially perpendicular to an axle, and the frame is in a lowered position.

FIG. 5 is a schematic top view of an embodiment of a suspension system, in which a wheel 18 is oriented substantially perpendicular to the axle 22, and the frame 12 is in a lowered position. As illustrated, the wheel 18 is substantially aligned with the longitudinal axis A (i.e., along a fore-aft direction relative to the work vehicle 10). With the wheel 18 in the illustrated straight position, the work vehicle 10 will traverse a field along a substantially straight line. In this configuration, the wheel 18 is separated from the hood 16 by a distance 66. However, if the second steering cylinder 44 rotates the wheel 18 in the counter-clockwise direction 48, the distance 66 between the wheel 18 and the hood 16 will increase. Conversely, if the second steering cylinder 44 rotates the wheel 18 in the clockwise direction 50, the distance 66 between the wheel 18 and the hood 16 will decrease. A sensor 68 coupled to the axle 22 is configured to output a signal indicative of the steering angle.

Figure 6:
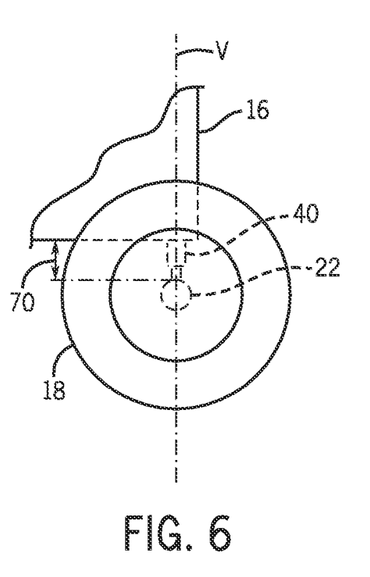
FIG. 6 is a schematic side view of the suspension system shown in FIG. 5.

FIG. 6 is a schematic side view of the suspension system shown in FIG. 5. As illustrated, the second actuating cylinder 40 is in a neutral position, thereby positioning the hood 16 a distance 70 above the axle 22. As a result, the wheel 18 overlaps the hood 16 along a vertical axis V. Therefore, if the second steering cylinder 44 rotates the wheel 18 in the clockwise direction 50 about the vertical axis V through a sufficient angle, the wheel 18 will contact the hood 16 (i.e., when the distance 66 becomes zero). Accordingly, while the frame 12 is in the illustrated lowered position, the steering angle is limited to a first range of motion.

Figure 7:
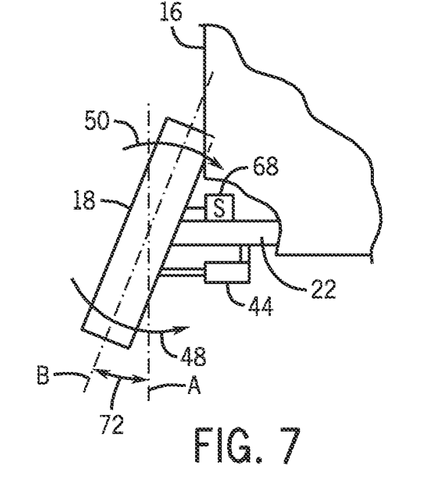
FIG. 7 is a schematic top view of the suspension system shown in FIG. 5, in which the wheel is rotated relative to the axle, and the frame is in a raised position.

FIG. 7 is a schematic top view of the suspension system shown in FIG. 5, in which the wheel 18 is rotated relative to the axle 22, and the frame 12 is in a raised position. As illustrated, the wheel 18 is rotated in the clockwise direction 50 such that an axis B of the wheel forms an angle 72 with respect to the longitudinal axis A. With the wheel 18 oriented at the illustrated angle 72, the work vehicle 10 will turn in a right-hand direction, i.e., the vehicle 10 will rotate in the clockwise direction 50 when moving in a forward direction of travel. As discussed in detail below, because the frame 12 is in the raised position, sufficient clearance is provided to enable a portion of the wheel 18 to pass under the hood 16, thereby facilitating an increased steering angle.

Figure 8:
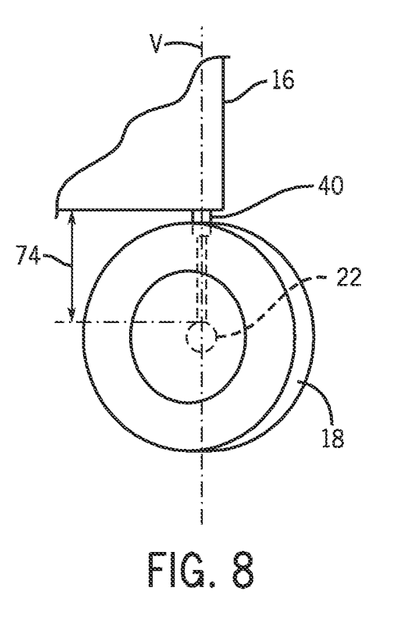
FIG. 8 is a schematic side view of the suspension system shown in FIG. 7.

FIG. 8 is a schematic side view of the suspension system shown in FIG. 7. As illustrated, the second actuating cylinder 40 is in an extended position, thereby positioning the hood 16 a distance 74 above the axle 22. As a result, the wheel 18 is positioned below the hood 16 along the vertical axis V. Therefore, the second steering cylinder 44 may rotate the wheel 18 in the clockwise direction 50 about the vertical axis V through a larger angle without contact between the wheel 18 and the hood 16. Accordingly, while the frame 12 is in the illustrated raised position, the wheel 18 may be rotated through a second range of motion, greater than the first range of motion. While wheel clearance is described above with reference to a hood 16, it should be appreciated that transitioning the frame 12 to the raised position may enhance clearance between the wheel 18 and other components of the work vehicle 10, such as the frame 12, the engine and/or systems within the hood 16, for example. Furthermore, while a raised position and a lowered position are described above, it should be appreciated that certain embodiments may include one or more intermediate frame positions to provide a desired degree of clearance between the wheel 18 and a variety of components having various shapes and sizes.

Figure 9:
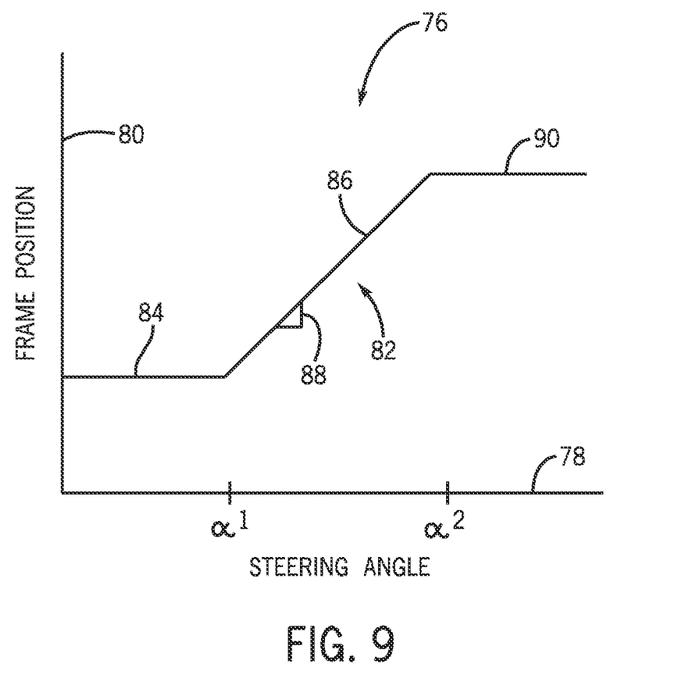
FIG. 9 is an exemplary graph of frame position versus steering angle for an embodiment of the suspension system.

FIG. 9 is an exemplary graph 76 of frame position versus steering angle for an embodiment of the suspension system. As illustrated, a horizontal axis 78 represents steering angle, a vertical axis 80 represents frame position relative to the axle, and a curve 82 represents an exemplary relationship between steering angle and frame position. In the illustrated embodiment, the curve 82 includes a substantially horizontal first portion 84, in which the frame position remains constant as the steering angle increases. The first portion 84 of the curve 82 represents the frame in the lowered position (i.e., a smaller distance between the frame 12 and the axle 22), in which the wheel 18 may rotate through a first range of motion without contact between the wheels and a component of the work vehicle 10.

The curve 82 also includes a second portion 86 in which the frame position increases as the steering angle increases. For example, if the steering angle increases above a first threshold value $\alpha_1$, the actuating cylinders 38 and 40 will progressively extend to increase a distance between the frame 12 and the axle 22, thereby progressively increasing clearance between the wheels and the work vehicle component (e.g., hood 16, frame 12, engine, etc.). In the illustrated embodiment, the second portion 86 of the curve 82 is linear, and has a slope 88. As will be appreciated, the slope 88 may be particularly selected to provide the desired relationship between steering angle and frame position. For example, the slope 88 may be at least partially dependent on the shape of the wheels 18 and/or the contour of the component. While the second portion 86 of the curve 82 is linear in the illustrated embodiment, it should be appreciated that other steering angle/frame position relationships (e.g., quadratic, cubic, logarithmic, etc.) may be employed in alternative embodiments.

Once the steering angle increases to a second threshold value $\alpha_2$, the frame position will remain constant as the steering angle increases, as represented by the third portion 90 of the curve 82. The third portion 90 of the curve 82 represents the frame in the raised position (i.e., a larger distance between the frame 12 and the axle 22), in which the wheel 18 may rotate through a second range of motion, greater than the first range of motion, without contact between the wheels and the component of the work vehicle 10. By way of example, the first threshold value $\alpha_1$ may be about 15 degrees, and the second threshold value $\alpha_2$ may be about 25 degrees. In such a configuration, the frame position will remain constant while the steering angle is less than 15 degrees, the frame position will increase as the steering angle increases between 15 degrees and 25 degrees, and the frame position will remain constant for steering angles greater than 25 degrees. As will be appreciated, higher or lower first and second threshold values may be employed in alternative embodiments. For example, the first threshold value $\alpha_1$ may be greater than about 5, 7, 10, 12, 15, 17, or 20 degrees, or more, and the second threshold value $\alpha_2$ may be greater than about 15, 17, 20, 22, 25, 27, or 30 degrees, or more. In addition, while the illustrated curve 82 includes three portions, it should be appreciated that other curves 82 may include additional portions, each having a particularly selected steering angle/frame position relationship.

Figure 10:
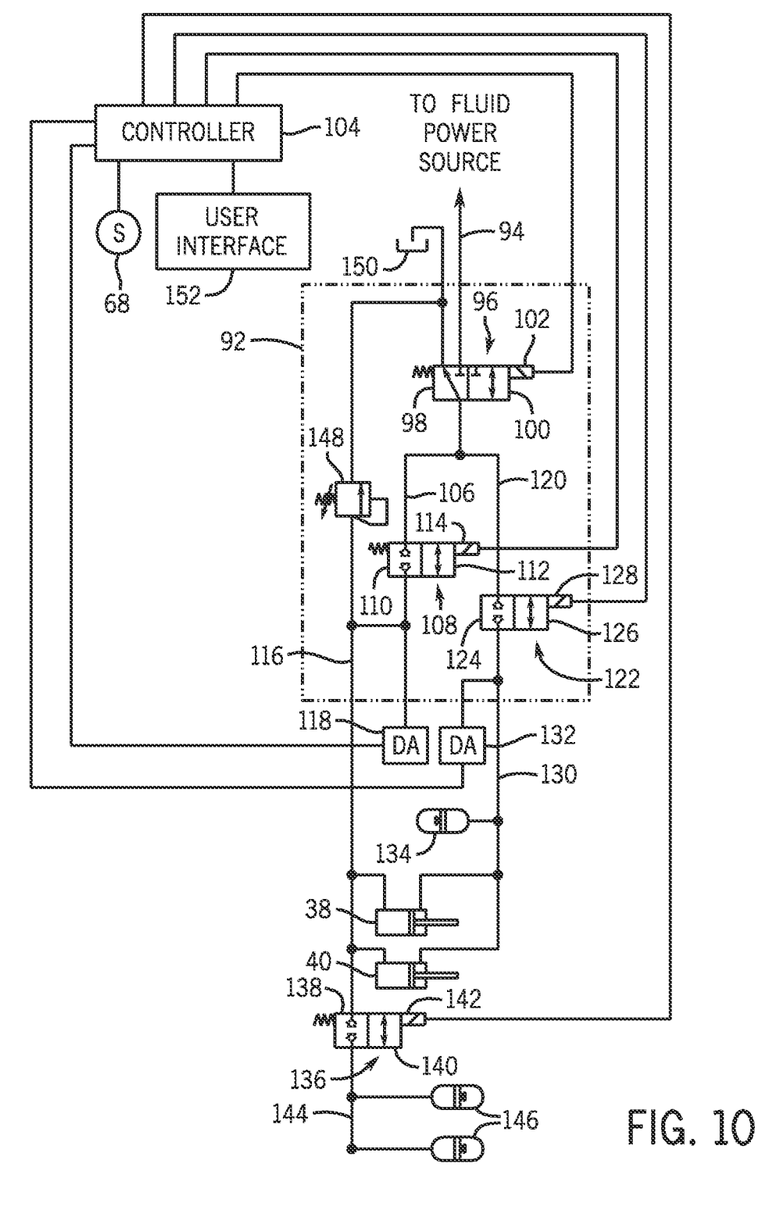
FIG. 10 is a schematic diagram of an embodiment of a hydraulic system that may be employed within the suspension system of FIG. 2.

FIG. 10 is a schematic diagram of an embodiment of a hydraulic system that may be employed within the suspension system of FIG. 2. As previously discussed, the actuating cylinders 38 and 40 are configured to adjust frame position to provide a desired degree of clearance between the wheels and a work vehicle component. In the illustrated embodiment, the suspension system includes a fluid control module 92 configured to regulate fluid flow to the cylinders 38 and 40 to achieve the desired frame position. As illustrated, a hydraulic supply conduit 94 provides pressurized hydraulic fluid to a first valve 96 within the fluid control module 92. The first valve 96 is a two position/three way hydraulic valve. The first position 98 is configured to block fluid flow to downstream valves, and the second position 100 is configured to enable fluid flow to the downstream valves. An electronic actuator (e.g., solenoid) 102 is configured to control the position of the valve 96. In the illustrated embodiment, the electronic actuator 102 is communicatively coupled to a controller 104 configured to control operation of each valve within the fluid control module 92.

If the first valve 96 is in the second position 100, hydraulic fluid will flow through a conduit 106 to a second valve 108. The second valve 108 is a two position/two way hydraulic valve. The first position 110 is configured to block fluid flow to a cap end of the actuating cylinders 38 and 40, and the second position 112 is configured to enable fluid flow to the cap end of the actuating cylinders 38 and 40. An electronic actuator (e.g., solenoid) 114, communicatively coupled to the controller 104, is configured to control the position of the valve 108. As illustrated, the second valve 108 is fluidly coupled to the cap end of the actuating cylinders 38 and 40 via a conduit 116. In addition, a pressure sensor 118 is fluidly coupled to the conduit 116, and configured to output a signal indicative of hydraulic pressure within the cap end of the cylinders 38 and 40.

Furthermore, if the first valve 96 is in the second position 100, hydraulic fluid will flow through a conduit 120 to a third valve 122. The third valve 122 is a two position/two way hydraulic valve. The first position 124 is configured to block fluid flow to a rod end of the actuating cylinders 38 and 40, and the second position 126 is configured to enable fluid flow to the rod end of the actuating cylinders 38 and 40. An electronic actuator (e.g., solenoid) 128, communicatively coupled to the controller 104, is configured to control the position of the valve 122. As illustrated, the third valve 122 is fluidly coupled to the rod end of the actuating cylinders 38 and 40 via a conduit 130. In addition, a pressure sensor 132 is fluidly coupled to the conduit 130, and configured to output a signal indicative of hydraulic pressure within the rod end of the cylinders 38 and 40.

In the illustrated embodiment, an accumulator 134 is fluidly coupled to the conduit 130. The accumulator 134 is configured to enable hydraulic fluid from the rod end of the actuating cylinders 38 and 40 to enter and exit the accumulator, thereby facilitating movement of the actuating cylinder piston rods through a range of suspension travel. This configuration enables the actuating cylinders 38 and 40 to damp vertical and/or oscillatory movement of the axle 22 with respect to the frame 12, thereby enhancing ride quality.

The hydraulic system also includes a lockout valve 136 fluidly coupled to the conduit 116. The lockout valve 136 is a two position/two way hydraulic valve. The first position 138 is configured to block fluid flow from downstream accumulators to the cap end of the actuating cylinders 38 and 40, and the second position 140 is configured to enable fluid flow from the downstream accumulators to the cap end of the actuating cylinders 38 and 40. An electronic actuator (e.g., solenoid) 142, communicatively coupled to the controller 104, is configured to control the position of the valve 136. As illustrated, a fluid conduit 144 extends between the lockout valve 136 and the accumulators 146. While the lockout valve 136 is in the second position 140, hydraulic fluid from the cap end of the actuating cylinders 38 and 40 may enter and exit the accumulators 146, thereby facilitating movement of the actuating cylinder piston rods through a range of suspension travel. This configuration enables the actuating cylinders 38 and 40 to damp vertical and/or oscillatory movement of the axle 22 with respect to the frame 12, thereby enhancing ride quality. However, an operator may transition the lockout valve 136 to the first position 138 to block fluid flow between the cap end of the cylinders 38 and 40, and the accumulators 146. As a result, movement of the axle 22 relative to the frame 12 will be substantially blocked, thereby enabling an operator to attach an implement to the work vehicle 10.

The hydraulic system also includes a pressure relief valve 148 in fluid communication with the conduit 116. If a fluid pressure within the cap end of the actuating cylinders 38 and 40 exceeds a threshold value, the pressure relief valve 148 will open, thereby facilitating flow of hydraulic fluid into a reservoir 150. Such a configuration may substantially reduce the possibility of over-pressurization of the hydraulic system.

In certain embodiments, the controller 104 is configured to receive a signal indicative of steering angle from the sensor 68, and to adjust a position of the frame 12 relative to the axle 22 such that the range of motion (i.e., maximum wheel rotation without contact between the wheel and a component of the work vehicle) is greater than the steering angle. For example, if the steering angle is between the first threshold value $\alpha_1$ and the second threshold value $\alpha_2$, the controller 104 will instruct the actuating cylinders 38 and 40 to progressively increase the distance between the frame 12 and the axle 22 as the steering angle increases. Specifically, the controller 104 will instruct the first valve 96 to transition to the second position 100, thereby establishing a flow path from the fluid power source to the second valve 108. The controller 104 will then instruct the second valve 108 to transition to the second position 112, thereby facilitating fluid flow to the cap end of the actuating cylinders 38 and 40. The increased fluid flow to the cap end of the actuating cylinders 38 and 40 will drive the piston rods to extend, thereby increasing the distance between the frame 12 and the axle 22, and establishing a larger steering range of motion.

Conversely, the controller 104 may instruct the actuating cylinders 38 and 40 to progressively decrease the distance between the frame 12 and the axle 22 as the steering angle decreases. For example, the controller 104 may instruct the first valve 96 to transition to the second position 100, thereby establishing a flow path from the fluid power source to the third valve 122. The controller 104 may then instruct the third valve 122 to transition to the second position 126, thereby facilitating fluid flow to the rod end of the actuating cylinders 38 and 40. The increased fluid flow to the rod end of the actuating cylinders 38 and 40 will drive the piston rods to retract, thereby decreasing the distance between the frame 12 and the axle 22, and establishing enhanced visibility over the hood 16.

The controller 104 may also be configured to adjust fluid flow to the actuating cylinders 38 and 40 based on feedback received from the pressure sensors 118 and 132. For example, the controller 104 may determine a target fluid pressure based on the desired degree of piston rod extension or retraction. In such a configuration, the controller may instruct the fluid control module 92 to increase fluid pressure until the target value is achieved. In addition, the controller 104 may be configured to receive signals indicative of piston rod position from position sensors coupled to the actuating cylinders 38 and 40. In such a configuration, the controller 104 may adjust fluid pressure until the desired piston rod position is achieved. Furthermore, the illustrated embodiment includes a user interface 152 configured to receive manual input from an operator. For example, an operator may input tire size, tire tread depth, expected ground speed and/or other parameters. The controller 104, in turn, may adjust the frame position based on the operator input parameters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A suspension system, comprising:
an axle configured to support a first wheel on a first lateral end of the axle, and a second wheel on a second lateral end of the axle;
a steering assembly configured to rotate each wheel relative to the axle about a substantially vertical axis; and
an actuating cylinder extending between the axle and a frame of a work vehicle, wherein the actuating cylinder is configured to transition the frame between a lowered position that enables the steering assembly to rotate each wheel through a first range of motion without contact between the wheels and a component of the work vehicle, and a raised position that enables the steering assembly to rotate the wheels through a second range of motion without contact between the wheels and the component, wherein the second range of motion is greater than the first range of motion,
wherein the actuating cylinder comprises a hydraulic cylinder configured to enable movement of the frame with respect to the axle over a range of suspension travel, and wherein the range of suspension travel decreases as the frame transitions toward the raised position.

2. The suspension system of claim 1, comprising:
a sensor configured to output a signal indicative of a steering angle of the wheels; and
a controller communicatively coupled to the sensor, wherein the controller is configured to receive the signal, and to instruct the actuating cylinder to transition the frame toward the raised position if the steering angle exceeds a first threshold value.

3. The suspension system of claim 2, wherein the first threshold value is about 15 degrees.

4. The suspension system of claim 2, wherein the controller is configured to instruct the actuating cylinder to adjust a position of the frame based on the steering angle while the steering angle is between the first threshold value and a second threshold value, to maintain the frame in the lowed position while the steering angle is less than or equal to the first threshold value, and to maintain the frame in the raised position while the steering angle is greater than or equal to the second threshold value.

5. The suspension system of claim 4, wherein the second threshold value is about 25 degrees.

6. The suspension system of claim 2, wherein the controller is configured to receive signals indicative of at least one of tire size, tire tread depth, ground speed and actuating cylinder piston rod position, and to adjust a position of the frame based on the signals.

7. A suspension system, comprising:
an axle configured to support a first wheel on a first lateral end of the axle, and a second wheel on a second lateral end of the axle;
a steering assembly configured to rotate each wheel relative to the axle about a substantially vertical axis;
an actuating cylinder extending between the axle and a frame of a work vehicle, wherein the actuating cylinder is configured to transition the frame between a lowered position that enables the steering assembly to rotate each wheel through a first range of motion without contact between the wheels and a component of the work vehicle, and a raised position that enables the steering assembly to rotate the wheels through a second range of motion without contact between the wheels and the component, wherein the second range of motion is greater than the first range of motion; and
an axle carrier extending between the frame and the axle, wherein the axle carrier is configured to rotate relative to the frame about a lateral axis to facilitate vertical movement of the axle, and the axle is configured to pivot about the axle carrier to enable oscillatory movement of the axle about a substantially longitudinal axis.

8. The suspension system of claim 7, comprising a first actuating cylinder extending between a first lateral side of the axle and the frame, and a second actuating cylinder extending between a second lateral side of the axle and the frame, wherein the first and second actuating cylinders are configured to enable movement of the axle with respect to the frame over a range of suspension travel.

9. A suspension system, comprising:
an axle configured to support a first wheel on a first lateral end of the axle, and a second wheel on a second lateral end of the axle;
a steering assembly configured to rotate each wheel relative to the axle about a substantially vertical axis, wherein the wheels are rotatable through a range of motion without contact between the wheels and a component of a work vehicle;
a sensor configured to output a signal indicative of a steering angle of the wheels;
an actuating cylinder extending between the axle and a frame of the work vehicle, wherein the actuating cylinder is configured to adjust a position of the frame relative to the axle; and
a controller communicatively coupled to the sensor, wherein the controller is configured to receive the signal, and to instruct the actuating cylinder to adjust the position of the frame relative to the axle based on the steering angle such that the range of motion is greater than the steering angle.

10. The suspension system of claim 9, wherein the controller is configured to instruct the actuating cylinder to maintain the frame in a lowered position having a first range of motion while the steering angle is less than or equal to a first threshold value, and to maintain the frame in a raised position having a second range of motion while the steering angle is greater than or equal to a second threshold value, wherein the second range of motion is greater than the first range of motion.

11. The suspension system of claim 10, wherein the first threshold value is about 15 degrees, and the second threshold value is about 25 degrees.

12. The suspension system of claim 9, wherein the controller is configured to receive signals indicative of at least one of tire size, tire tread depth, ground speed and actuating cylinder piston rod position, and to adjust the position of the frame based on the signals.

13. The suspension system of claim 9, comprising an axle carrier extending between the frame and the axle, wherein the axle carrier is configured to rotate relative to the frame about a lateral axis to facilitate vertical movement of the axle, and the axle is configured to pivot about the axle carrier to enable oscillatory movement of the axle about a substantially longitudinal axis.

14. A suspension system, comprising:
an axle configured to support a first wheel on a first lateral end of the axle, and a second wheel on a second lateral end of the axle;
an axle carrier extending between a frame of a work vehicle and the axle, wherein the axle carrier is configured to rotate relative to the frame about a lateral axis to facilitate vertical movement of the axle, and the axle is configured to pivot about the axle carrier to enable oscillatory movement of the axle about a substantially longitudinal axis;
a steering assembly configured to rotate each wheel relative to the axle about a substantially vertical axis;
a first actuating cylinder extending between a first lateral side of the axle and the frame; and
a second actuating cylinder extending between a second lateral side of the axle and the frame, wherein the first and second actuating cylinders are configured to transition the frame between a lowered position that enables the steering assembly to rotate each wheel through a first range of motion without contact between the wheels and a component of the work vehicle, and a raised position that enables the steering assembly to rotate the wheels through a second range of motion without contact between the wheels and the component, wherein the second range of motion is greater than the first range of motion.

15. The suspension system of claim 14, comprising:
a sensor configured to output a signal indicative of a steering angle of the wheels; and
a controller communicatively coupled to the sensor, wherein the controller is configured to receive the signal, and to instruct the first and second actuating cylinders to transition the frame toward the raised position if the steering angle exceeds a first threshold value.

16. The suspension system of claim 15, wherein the controller is configured to instruct the first and second actuating cylinders to adjust a position of the frame based on the steering angle while the steering angle is between the first threshold value and a second threshold value, to maintain the frame in the lowered position while the steering angle is less than or equal to the first threshold value, and to maintain the frame in the raised position while the steering angle is greater than or equal to the second threshold value.

17. The suspension system of claim 16, wherein the first threshold value is about 15 degrees, and the second threshold value is about 25 degrees.

18. The suspension system of claim 14, wherein each actuating cylinder comprises a hydraulic cylinder configured to enable movement of the axle with respect to the frame over a range of suspension travel.

19. The suspension system of claim 8, comprising:
a sensor configured to output a signal indicative of a steering angle of the wheels; and
a controller communicatively coupled to the sensor, wherein the controller is configured to receive the signal, and to instruct the actuating cylinder to transition the frame toward the raised position if the steering angle exceeds a first threshold value, wherein the first threshold value is about 15 degrees.

20. The suspension system of claim 19, wherein the controller is configured to instruct the actuating cylinder to adjust a position of the frame based on the steering angle while the steering angle is between the first threshold value and a second threshold value, to maintain the frame in the lowed position while the steering angle is less than or equal to the first threshold value, and to maintain the frame in the raised position while the steering angle is greater than or equal to the second threshold value, wherein the second threshold value is about 25 degrees, and wherein the controller is configured to receive signals indicative of at least one of tire size, tire tread depth, ground speed and actuating cylinder piston rod position, and to adjust a position of the frame based on the signals.

* * * * *